United States Patent
Fukuda et al.

(10) Patent No.: US 6,627,347 B2
(45) Date of Patent: Sep. 30, 2003

(54) RECTANGULAR ELECTRODE AND LEAD PART THEREFOR

(75) Inventors: Shinsuke Fukuda, Toyohashi (JP); Izumi Yamamura, Toyohashi (JP); Hiromi Kajiya, Toyohashi (JP); Yoshihiro Tokutome, Toyota (JP)

(73) Assignees: Matsushita Electric Industrial Co., Ltd., Osaka (JP); Toyota Jidosah Kabushiki Kaisha, Aichi (JP)

(*) Notice: Subject to any disclaimer, the term of this patent is extended or adjusted under 35 U.S.C. 154(b) by 160 days.

(21) Appl. No.: 09/833,682

(22) Filed: Apr. 12, 2001

(65) Prior Publication Data

US 2001/0031395 A1 Oct. 18, 2001

(30) Foreign Application Priority Data

Apr. 14, 2000 (JP) .......................... 2000-113067

(51) Int. Cl.[7] .................................. H01M 4/70
(52) U.S. Cl. .................. 429/161; 429/211; 429/233; 429/236
(58) Field of Search ................ 429/161, 211, 429/233, 236

(56) References Cited

U.S. PATENT DOCUMENTS

| 528,445 | A | * | 10/1894 | Rhetts | ......................... 429/239 |
|---|---|---|---|---|---|
| 2,182,905 | A | | 12/1939 | Stevens | |
| 2,807,227 | A | | 9/1957 | Kerns et al. | |
| 2,845,470 | A | * | 7/1958 | Haskell | ......................... 136/45 |
| 3,873,366 | A | * | 3/1975 | Sundberg | ......................... 136/26 |
| 3,966,497 | A | | 6/1976 | Honer | |
| 4,053,695 | A | | 10/1977 | Peters et al. | |
| 4,646,430 | A | * | 3/1987 | Clarke | ......................... 29/623.1 |
| 5,344,466 | A | | 9/1994 | Rose et al. | |
| 6,242,128 | B1 | * | 6/2001 | Tura | ......................... 429/161 |

FOREIGN PATENT DOCUMENTS

| EP | 0 371 670 | 6/1990 |
|---|---|---|
| JP | 2119159 | 11/1983 |
| JP | 11-144712 | 5/1999 |
| JP | 2000-260478 | 9/2000 |

* cited by examiner

Primary Examiner—Mark Ruthkosky
(74) Attorney, Agent, or Firm—Jordan and Hamburg LLP (57) ABSTRACT

A rectangular electrode plate including a core metal sheet and a mixture paste coated thereon has a lead on one long side edge thereof where no mixture is coated, and a mixture non-coated part on the other side edge thereof. Positioning holes are punched only in the lead so that the stress exerted when punching the holes will not cause the mixture paste to fall off. Stacked electrode plates are accommodated within a magazine with a certain clearance between the three side edges of the electrodes other than the lead and the inner surface of the magazine, and fed one by one to be assembled into an electrode plate group to form a battery.

6 Claims, 7 Drawing Sheets

RECTANGULAR ELECTRODE AND LEAD PART THEREFOR

BACKGROUND OF THE INVENTION

1. Technical Field of the Invention

The present invention relates to electrodes of various batteries and an assembling method thereof.

2. Description of Related Art

Figure 8A:
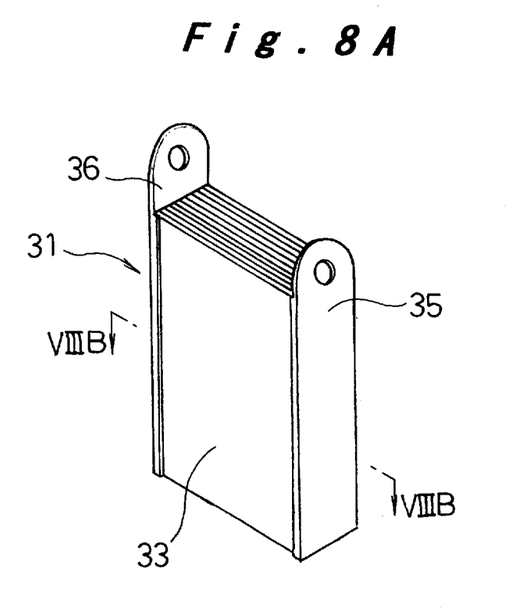
FIG. 8A is a perspective view showing an electrode plate group of the present invention.
Figure 8B:
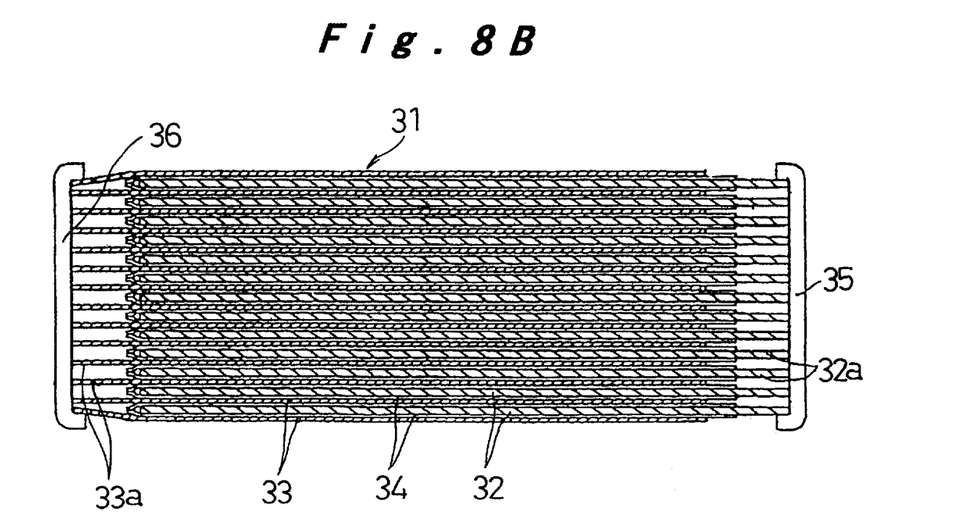
FIG. 8B is an enlarged sectional view taken along line VIIIB—VIIIB shown in FIG. 8A.

FIGS. 8A and 8B show an electrode plate group 31 to be accommodated together with electrolyte within a battery case to constitute a prismatic battery. The electrode plate group 31 is composed of a large number of positive electrode plates 32 and negative electrode plates 33 that are alternately stacked upon one another with intervening separators 34 therebetween. As shown in FIG. 8B, the electrode plates 32, 33 are laterally offset from each other so that side edges on one side of the positive electrode plates 32 and those of the negative electrode plates 33 are protruded outwards in opposite directions, and these protruded side edges of the electrode plates constitute respective leads 32a, 33a. A positive collector plate 35 and a negative collector plate 36 are abutted perpendicularly on the leads 32a, 33a of the positive and negative electrode plates 32, 33, respectively, and joined thereto by welding.

The electrode plate group 31 is formed such that negative electrode plates are arranged on both outermost sides thereof. After welding the collector plates to the side edges of the electrode plate group by electronic beam welding or the like, resistance across both collector plates is measured for inspection for short circuits, and the electrode plate groups that have passed the short-circuit test are inserted into battery cases.

Figure 9:
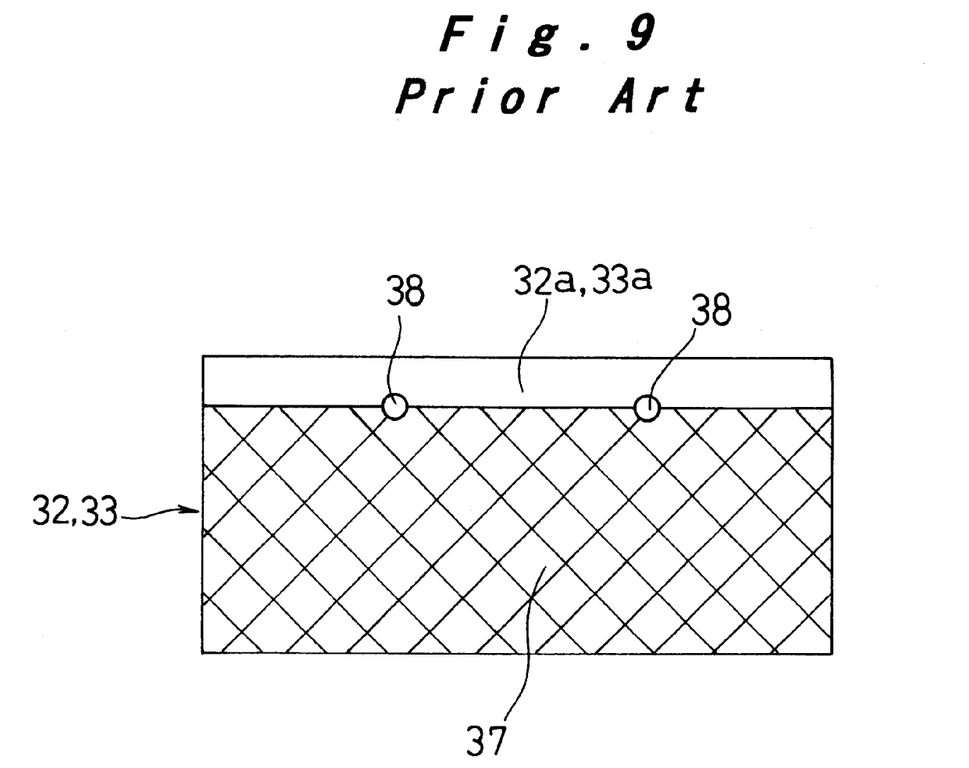
FIG. 9 is a plan view showing a prior art electrode plate.

FIG. 9 shows a prior art positive or negative electrode plate 32 or 33. The electrode plate is rectangular, and substantially the entire surface thereof is coated or filled with mixture 37 except the lead 32a or 33a disposed on one side edge thereof. The electrode plate further has positioning holes 38 used when stacking the electrodes, spanning into the area coated with the mixture 37.

The mixture that has been applied on core metal sheets of the electrode plates is apt to fall off particularly when punching the electrode plates to form such positioning holes 38. Also, during transportation and assembling of electrode plates, the mixture can be readily peeled off by surrounding equipment or tools contacting thereto particularly at the three side edges other than the side edge where the lead 32a or 33a is formed. The falling mixture may adhere to the surface of electrode plates and cause short-circuiting later.

Such problem would not arise as long as the electrode plates are manually handled using jigs with sufficient caution. Manual assembly would be, however, unpractical in view of its extremely poor working efficiency. Thus there was the need for solving the problem of falling mixture that may lead to short-circuiting in the process step of assembling electrode plates into a battery.

SUMMARY OF THE INVENTION

The present invention has been devised in light of the above-described problem in prior art, and it is an object of the invention to provide electrodes and an assembling method thereof, by which mixture paste coated on electrode plates is prevented from falling off during the assembling process of electrode plates, so that resultant electrodes will be free of short circuits.

A rectangular electrode for a battery according to the invention includes a mixture coated part having a core material and a mixture coated thereon and occupying substantially an entire surface of the electrode, a lead part on one side edge of the electrode where no mixture is coated, and a positioning hole formed only in the lead part.

A reinforcing member may be joined to the lead part at least around the positioning hole for increasing rigidity thereof.

According to another aspect of the invention, a rectangular electrode for a battery includes a mixture coated part having a core material and a mixture coated thereon, a lead part on one side edge of the electrode where no mixture is coated, and a mixture non-coated part on one side edge of the electrode opposite from the lead part.

An additional mixture non-coated part may be provided on both side edges orthogonal to the lead part.

Further, the lead part may include a guiding notch for fixedly positioning the electrode in a lengthwise direction thereof.

A method for assembling electrodes according to the invention includes the steps of:

holding a plurality of electrodes of a first polarity in stacked arrangement within a first magazine;

holding a plurality of electrodes of a second polarity opposite the first polarity in stacked arrangement within a second magazine;

arranging a plurality of first magazines and second magazines in alternate arrangement along a transfer path of a moving assembling jig having a positioning pin thereon;

feeding the assembling jig intermittently along the transfer path, stopping at a position opposite either one of the first magazine and the second magazine; and transferring the electrodes of the first polarity one by one from the first magazine onto the assembling jig at a halt, positioning of the electrodes with respect to the assembling jig being achieved by the positioning pin; and transferring the electrodes of the second polarity one by one from the second magazine onto the assembling jig at a halt, such that the electrodes of opposite polarity are stacked alternately on the assembling jig.

The first or second magazine includes a guide rail extending on an inner surface thereof in a stacking direction for engagement with a corresponding guiding part provided in the electrodes, and a storage space therein which, in a state that the electrodes are accommodated within the first or second magazine with their guiding parts engaging with the guide rail, permits a clearance to be formed between three side edges of the electrodes and the inner surface of the first or second magazine.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Preferred embodiments of an electrode and an assembling method thereof according to the invention will be hereinafter described with reference to FIG. 1 through FIG. 7. The invention will be described as being applied to positive and negative electrode plates of rechargeable batteries, but the application of the invention should not be limited only to rechargeable batteries. Mixtures of battery active materials and various additives which are prepared in the form of a paste and applied on core materials of electrode plates are simply referred to as a "mixture" in the following description. The mixture for negative electrode plates according to the invention contains a hydrogen-absorption alloy, a conductive material, and binder, whereas the mixture for positive electrode plates according to the invention contains nickel hydroxide and cobalt oxide. The positive and negative electrode plates are alternately stacked in laterally offset arrangement as shown in FIG. 8B to constitute an electrode plate group as shown in FIG. 8A. A further description of the electrode plate group is omitted, as it has already been described in the foregoing.

Figure 1:
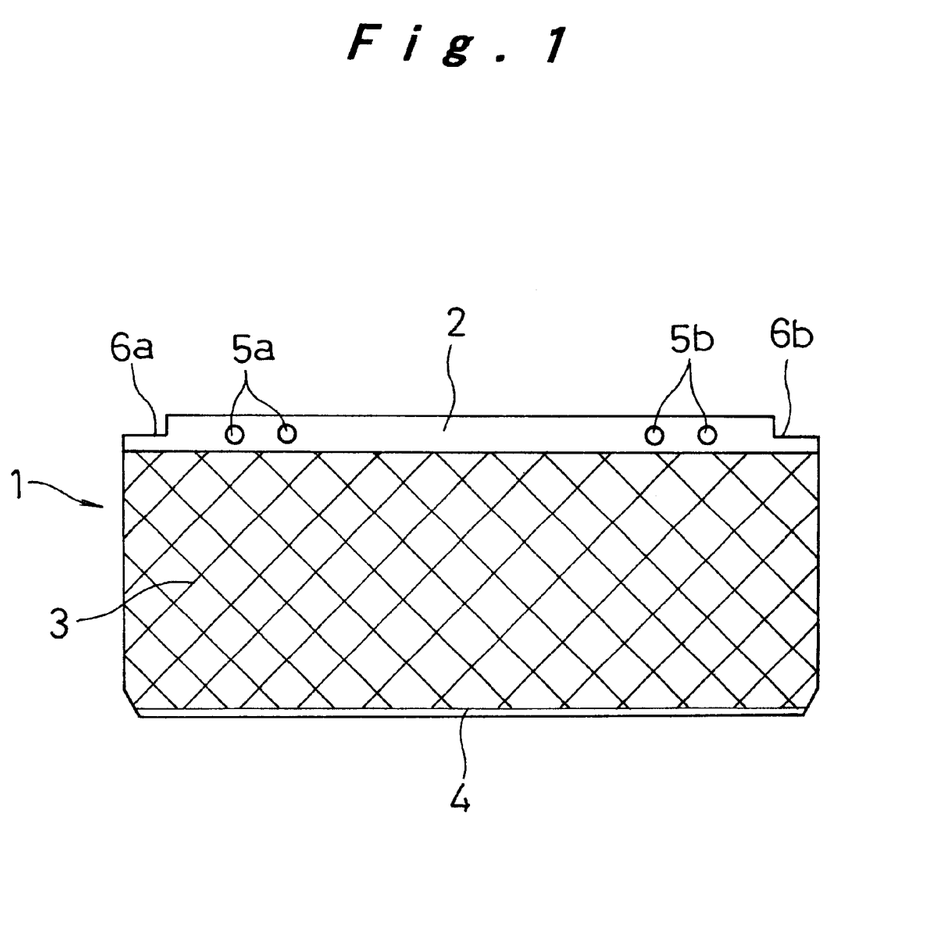
FIG. 1 is a plan view showing a negative electrode plate according to one embodiment of an electrode plate group for a battery, that uses electrodes and an assembling method thereof according to the present invention.

FIG. 1 shows a negative electrode plate 1 according to the invention. The negative electrode plate 1 is substantially rectangular and includes a lead 2 along the edge of one long side thereof. The area indicated by crossed oblique lines represents a mixture coated part 3 which, as shown, occupies substantially the entire surface of the electrode plate except for the lead 2. The core material of the negative electrode plate 1 is a punched or perforated metal substrate of Ni having a large number of pores on the entire surface thereof except for a part which will constitute the lead 2. The mixture coated part 3 is composed of the core material and a mixture of hydrogen-absorption alloy, a conductive material, and binder that is coated on the core material such as to fill the pores. The negative electrode plate 1 according to the invention further includes a mixture non-coated part 4 having a width of about 0.5 to 4.0 mm along the edge of the long side thereof opposite from the lead 2.

The lead 2 is formed with positioning holes 5a, 5b at appropriate distances from both longitudinal ends thereof such as not to bridge the lead 2 and the mixture coated part 3. In the illustrated example, two pairs of positioning holes are provided separately for jigs used for assembling the negative electrode plates and positive electrode plates together and for jigs used for welding collector plates perpendicular to the lead 2.

The lead 2 is further formed with L-shaped guiding notches 6a, 6b at both lengthwise ends thereof by cutting out the end corners of the lead 2 rectangularly. The guiding notches 6a, 6b are used for positioning the negative electrode plate along its lengthwise direction on the side of its lead 2 by engagement of the guiding notches 6a, 6b with corresponding guide rails to be described later.

As described above, the negative electrode plate 1 according to the invention has the positioning holes 5a, 5b only within the lead 2 and hence punching of the positioning holes in the lead does not impose stress on the mixture coated part 3. Thus the mixture coated part 3 is not affected by the punching process and the mixture does not fall off. The problem of peeling mixture which may develop a short circuit later is thereby resolved.

The negative electrode plate 1 also has a mixture non-coated part 4 on the opposite side from the lead 2. While the long side edge of the electrode plate is particularly subjected to impact during transportation or assembling of the electrode plate, the invention offers a solution to the problem by providing a mixture non-coated part 4 along the long side edge of the electrode plate, so that the mixture will not peel off, thereby preventing development of short circuits.

Figure 2:
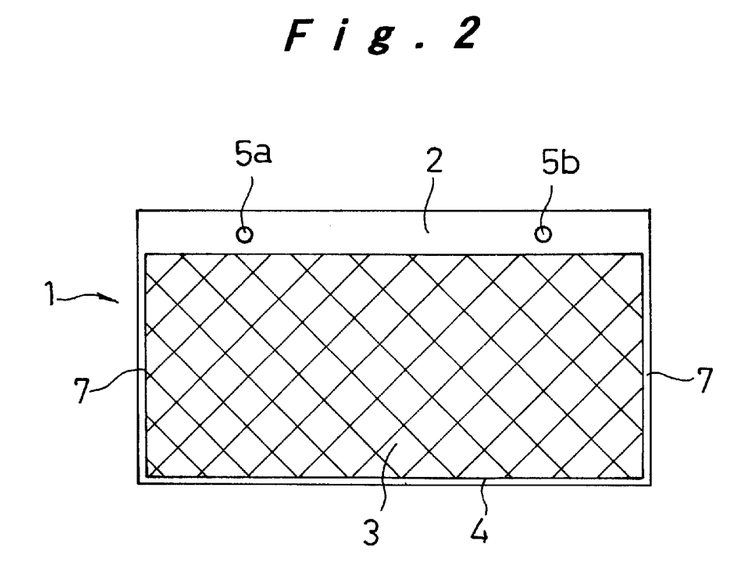
FIG. 2 is a plan view showing a modification example of the negative electrode plate.

FIG. 2 shows a modified example of the negative electrode plate according to the invention. As shown, in addition to the mixture non-coated part 4 along the edge of the long side opposite from the lead 2, mixture non-coated parts 7 are provided on both short sides of the electrode plate orthogonal to the lead 2. In the example shown in FIG. 2, only one pair of positioning holes 5a, 5b are formed, and guiding notches are not provided.

Figure 3A:
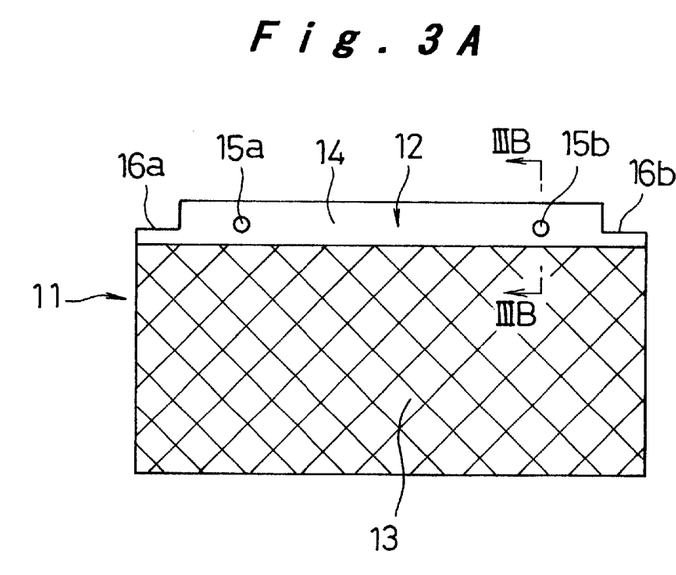
FIG. 3A is a plan view showing a positive electrode plate of the same embodiment.
Figure 3B:
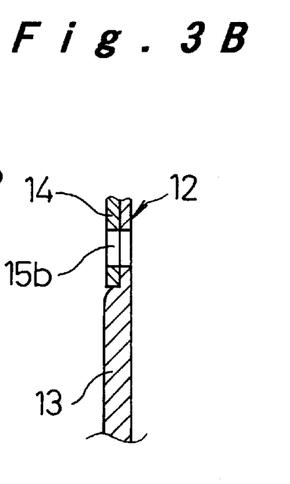
FIG. 3B is a sectional view taken along line IIIB—IIIB shown in FIG. 3A.

FIGS. 3A and 3B show a positive electrode plate 11 according to the invention. The positive electrode plate 11 is substantially rectangular and includes a lead 12 along the edge of one long side thereof. The area indicated by crossed oblique lines represents a mixture filling part 13 which occupies substantially the entire surface of the electrode plate except for the lead 12. The core material of the positive electrode plate 11 is a porous metal foam substrate containing Ni, and a mixture of nickel hydroxide, cobalt oxide and others is applied on the core material to fill the pores thereof and dried, thereby forming the mixture filling part 13. The lead 12 of the positive electrode plate 11 is formed by compressing one long side edge of the metal foam substrate, and by joining a lead plate, for reinforcement, to one face of the compressed metal foam substrate by seam welding or ultrasonic welding. The lead 12 which is reinforced by the lead plate 14 has a pair of positioning holes 15a, 15b at appropriate distances from both ends in the same manner as the negative electrode plate 1, and L-shaped guiding notches 16a, 16b formed on both ends thereof.

Thus the lead 12 is reinforced by the lead plate 14 to secure necessary strength for welding a collector plate to the lead 12, and to increase rigidity of the positioning holes 15a, 15b, whereby accurate positioning is achieved. Instead of the lead plate 14, a reinforcing member may be welded only to the part surrounding the positioning holes 15a, 15b.

The negative electrode plates 1 and the positive electrode plates 11 thus prepared are then alternately stacked upon one another in the laterally offset arrangement, with the positive electrode plates 11 being covered with bag-shaped separators in a lateral direction, so that both leads 2, 12 project outwards in opposite directions and the mixture coated part 3 and mixture filling part 13 of each negative and positive electrode plate oppose with each other through the separator. Collector plates of opposite polarity are welded perpendicularly to the leads 2, 12, respectively, to constitute an electrode plate group, after which it is accommodated within a prismatic battery case with an open top end together with liquid electrolyte. Finally, the open top end of the battery case is closed by a lid integrally with the case so as to form a nickel metal hydride battery.

Next, the step of assembling electrode plate groups by stacking the positive and negative electrode plate 1, 11 alternately will be described with reference to FIGS. 4A and 4B through FIG. 7.

Figure 4A:
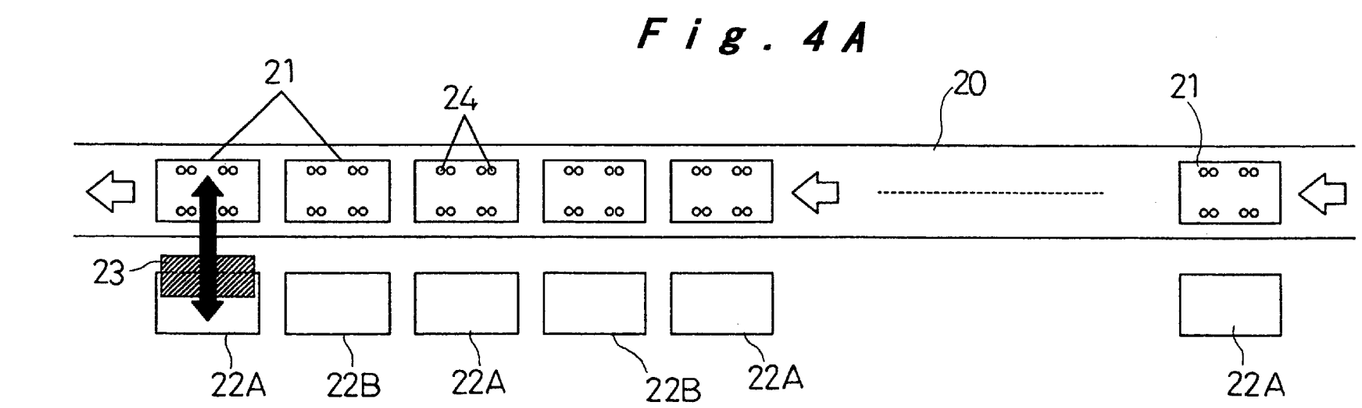
FIG. 4A is a plan view showing the step of assembling the negative electrode plates and the positive electrode plates.

As shown in FIG. 4A, a plurality of assembling jigs 21 are intermittently fed with a certain pitch distance by a transfer system 20. On one side of the transfer system, a predetermined number of electrode magazines 22A, 22B are arranged opposite each of the halt positions of the assembling jigs 21. The electrode magazines 22A accommodating negative electrode plates 1 stacked therein and the electrode magazines 22B accommodating positive electrode plates 11 stacked therein are alternately aligned along the transfer system. Each of the electrode magazines 22A, 22B is provided with a transfer device 23 for taking out the negative electrode plates 1 or the positive electrode plates 11 and transferring them onto the assembling jigs 21 stopping at opposite halt positions.

Figure 4B:
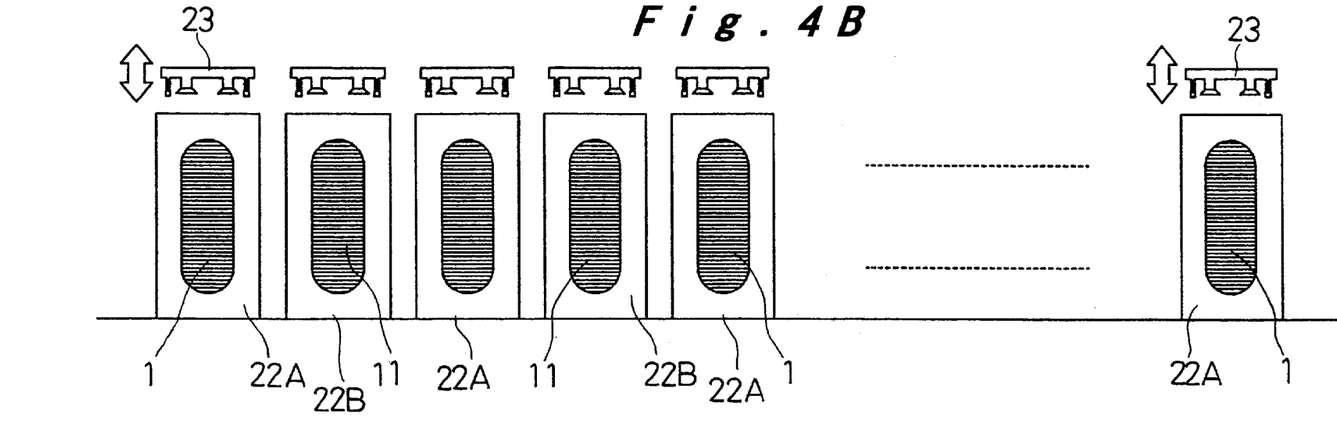
FIG. 4B is a front view showing the same.

In the illustrated example, the assembling jig 21 has four pairs of positioning pins 24 on both sides thereof, for receiving the two pairs of the positioning holes 5a, 5b of the negative electrode plates 1 and the positioning holes 15a, 15b of the positive electrode plates 11. Thus the positioning of electrode plates is achieved while positive and negative electrode plates are alternately stacked upon one another.

Figure 5:
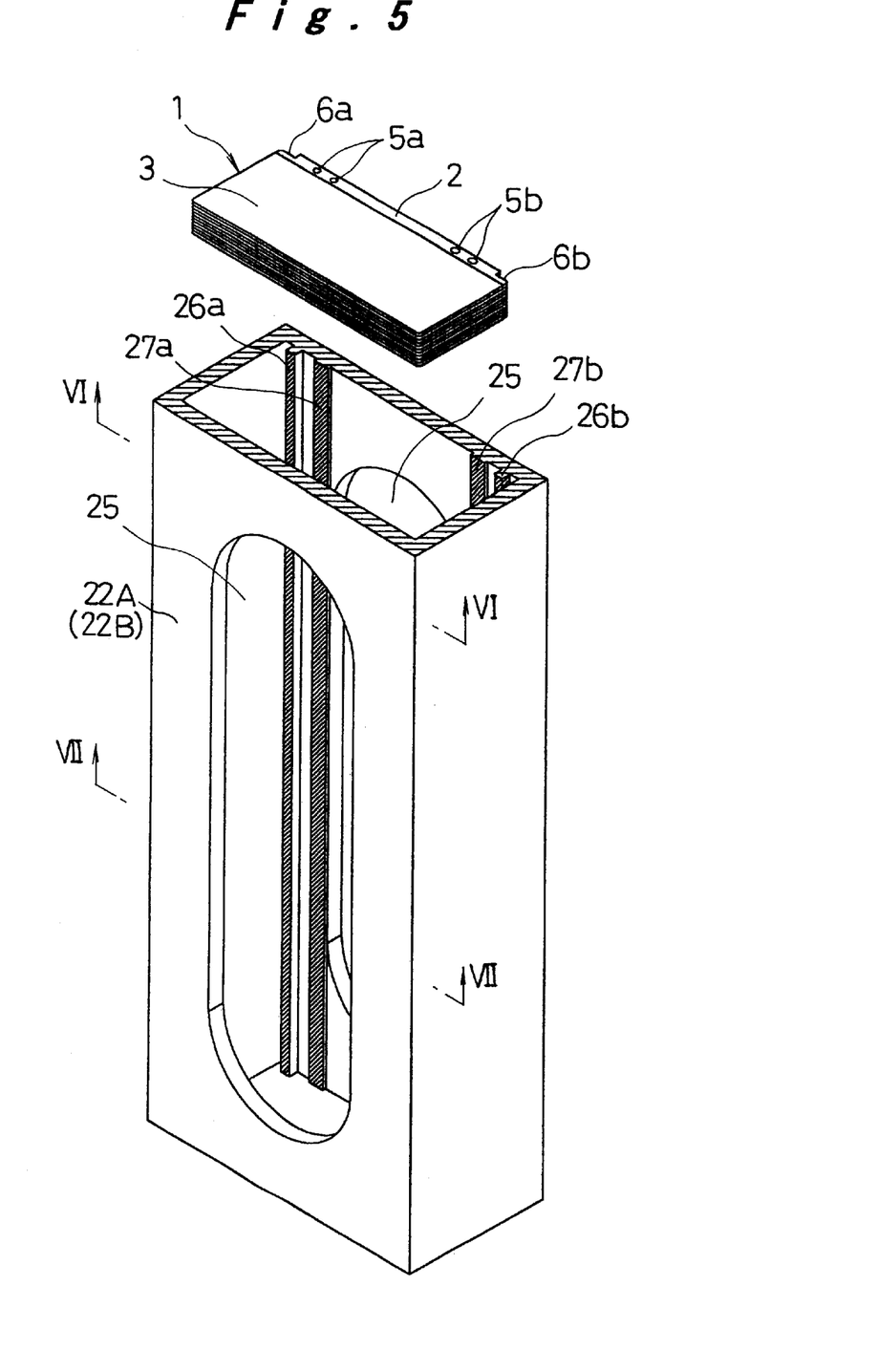
FIG. 5 is a perspective view showing an electrode magazine and the electrode plate group.
Figure 6:
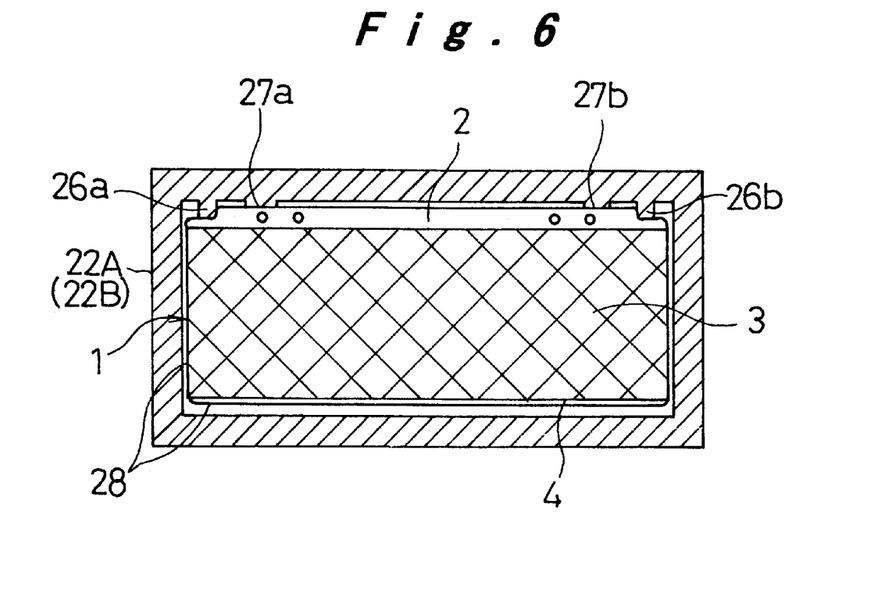
FIG. 6 is a cross sectional plan view taken along line VI—VI of FIG. 5, showing a negative electrode plate accommodated within the electrode magazine.

FIG. 5 shows an electrode magazine 22A for accommodating stacked negative electrode plates 1. The electrode magazine 22B for accommodating positive electrode plates 11 therein is similarly constructed. The magazine is a hollow rectangular case having a space therein for accommodating the rectangular positive and negative electrode plates 1, 11 in stacked arrangement. The case has elongated windows 25 on opposite side faces thereof, and a pair of guide rails 26a, 26b at both ends on an inner side thereof for engagement with the guiding notches 6a, 6b of the negative electrode plates 1 or the guiding notches 16a, 16b of the positive electrode plates 11. Further, a pair of contact faces 27a, 27b are formed on the inner side of respective guide rails 26a, 26b for contacting edge ends of the leads 2, 12. When negative electrode plates 1 or positive electrode plates 11 are accommodated in stacked arrangement within the electrode magazine 22A or 22B, with their guiding notches 6a, 6b or 16a, 16b engaging with the guide rails 26a, 26b and the edge ends of their leads 2 or 12 contacting the contact faces 27a, 27b, a certain gap or clearance 28 is formed between the three side edges of the electrode plate 1 or 11 other than the side where the lead 2 or 12 is formed and the inner wall of the electrode magazine 22A or 22B, as shown in FIG. 6.

Figure 7:
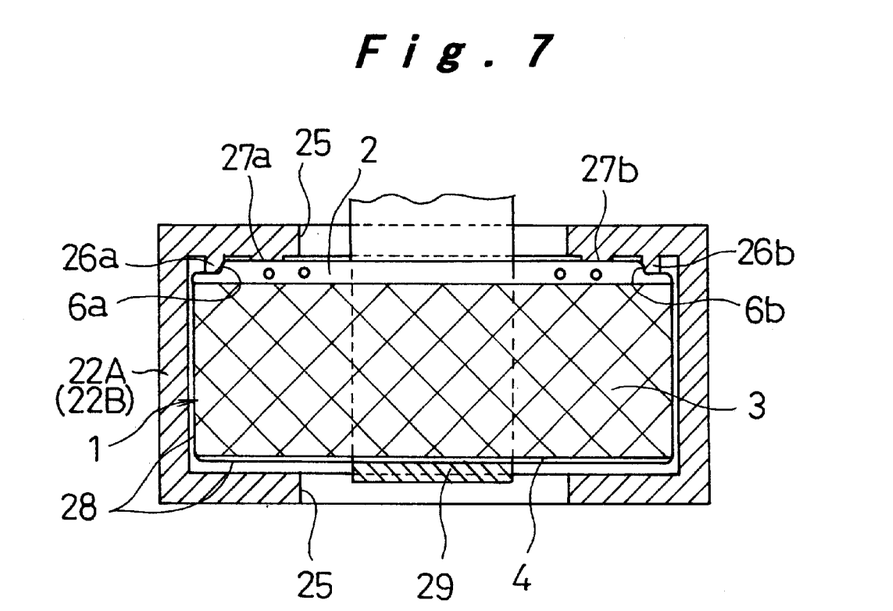
FIG. 7 is a cross sectional plan view taken along line VII—VII of FIG. 5, showing a negative electrode plate accommodated within the electrode magazine.

Each of the electrode magazines 22A, 22B also has a pushup device 29 which is disposed such as to cross the storage space of the electrode magazine through the windows 25 on the opposite side faces thereof as shown in FIG. 7. The push-up device 29 is capable of being driven in vertical directions so as to push up the stacked negative or positive electrode plates 1 or 11. While the transfer device 23 successively removes the uppermost electrode plate 1 or 11, the push-up device 29 sequentially lifts the stacked electrode plates 1 or 11 upwards, so that the uppermost electrode plate can be taken out at the same height.

With the electrode magazines 22A, 22B as described above, as the assembling jigs 21 are intermittently fed by the transfer system 20 as indicated by the arrows in FIG. 4A, negative electrode plates 1 and positive electrode plates 11 are sequentially transferred from the electrode magazines 22A, 22B and placed upon the assembling jigs 21 alternately upon one another, the positioning of the electrode plates being achieved by the positioning pins 24. Thus the positive and negative electrode plates 1, 11 are automatically assembled into electrode plate groups in an efficient manner.

As described above, electrode plates that have been coated or filled with mixtures are accommodated within magazines during the assembling process, with a certain clearance 28 being provided between the side edges of the electrode plates and the inner surface of the magazine. The stacked electrode plates are fixedly positioned against one inner wall of the magazine by the guide rails 26a, 26b engaging with the guiding notches 6a, 6b or 16a, 16b in the electrode plates 1, 11. Thus, the free three side edges of the electrode plates are prevented from contacting the inner surface of the magazine 22. The electrode plates are thus assembled, without the risk of letting the mixture fall off, into batteries that are free of short circuits with high reliability.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A rectangular electrode for a battery, comprising:
   a mixture coated part including a core material and a mixture coated thereon and occupying substantially an entire surface of the electrode;
   a lead part on one side edge of the electrode where no mixture is coated;
   said lead part extending across an entire length of said side edge of said electrode;
   said lead part including at least one guiding notch; and
   a positioning hole formed only in the lead part.

2. The electrode according to claim 1, wherein a reinforcing member is joined to the lead part at least around the positioning hole.

3. The electrode according to claim 1, wherein the guiding notch fixedly positions the electrode in a lengthwise direction thereof.

4. A rectangular electrode for a battery, comprising:
   a mixture coated part including a core material and a mixture coated thereon;
   a lead part on one side edge of the electrode where no mixture is coated;
   said lead part extending across an entire length of said side edge of said electrode;
   said lead part including at least one guiding notch; and
   a mixture non-coated part on one side edge of the electrode opposite from the lead part.

5. The electrode according to claim 4, further comprising a mixture non-coated part on both side edges orthogonal to the lead part.

6. The electrode according to claim 4, wherein the guiding notch fixedly positions the electrode in a lengthwise direction thereof.

* * * * *

UNITED STATES PATENT AND TRADEMARK OFFICE
CERTIFICATE OF CORRECTION

PATENT NO.   : 6,627,347 B2                                                Page 1 of 1
DATED        : September 30, 2003
INVENTOR(S)  : Shinsuke Fukuda et al.

It is certified that error appears in the above-identified patent and that said Letters Patent is hereby corrected as shown below:

<u>Title page,</u>
Item [73], Assignee, should read as follows:
-- [73]   Assignees:   Matsushita Electric Industrial Co., Ltd., Osaka (JP); Toyota Jidosha Kabushiki Kaisha, Aichi (JP) --.

Signed and Sealed this

Tenth Day of February, 2004

JON W. DUDAS
*Acting Director of the United States Patent and Trademark Office*